Figure 1:
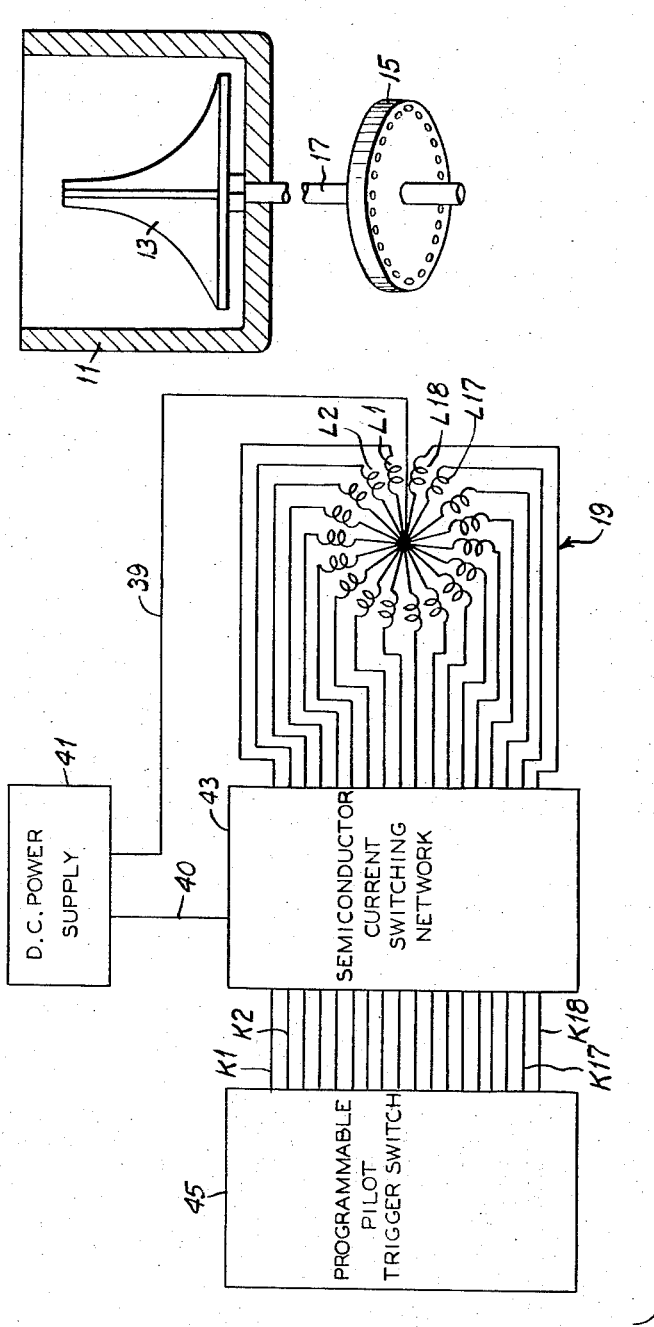

Dec. 5, 1967    C. T. BUTTON    3,356,920
ELECTROMAGNETIC APPARATUS INCLUDING SEMICONDUCTOR SWITCHING
MEANS FOR SIMULTANEOUSLY ENERGIZING A PLURALITY
OF STATOR WINDINGS
Filed Jan. 13, 1965    5 Sheets-Sheet 1

FIG. I.

Charles T. Button,
Inventor.
Koenig, Senniger, Powers and Leavitt,
Attorneys

Dec. 5, 1967

C. T. BUTTON 3,356,920

ELECTROMAGNETIC APPARATUS INCLUDING SEMICONDUCTOR SWITCHING
MEANS FOR SIMULTANEOUSLY ENERGIZING A PLURALITY
OF STATOR WINDINGS

Filed Jan. 13, 1965

5 Sheets-Sheet 4

United States Patent Office 3,356,920
Patented Dec. 5, 1967

3,356,920
ELECTROMAGNETIC APPARATUS INCLUDING SEMICONDUCTOR SWITCHING MEANS FOR SIMULTANEOUSLY ENERGIZING A PLURALITY OF STATOR WINDINGS
Charles T. Button, Dayton, Ohio, assignor to Texas Instruments Incorporated, Dallas, Tex., a corporation of Delaware
Filed Jan. 13, 1965, Ser. No. 425,265
16 Claims. (Cl. 318—138)

This invention relates to electromagnetic apparatus and more particularly to such apparatus in which semiconductor current switching devices are employed to produce a rotating magnetic field. The invention further relates to a method of creating a rotating magnetic field.

Among the several objects of this invention may be noted the provision of an actuator or electric motor which can be operated at variable speeds and can be reversed and which will operate at high efficiency; the provision of such a device which will operate on A.C. at speeds above the synchronous speeds of induction motors as determined by line frequency and number of poles, and which will operate on D.C. without commutator or brushes; the provision of such a device which can be operated as a positioning device or servo at speeds near zero, and which can be operated in an oscillatory mode. Further objects include the provision of electromagnetic apparatus which can be employed for frequency or phase conversion of alternating current power or for the conversion of D.C. to sine wave A.C. at a predetermined or variable frequency. A still further object includes the provision of a novel method of creating a rotating magnetic field. Other objects and features will be in part apparent and in part pointed out hereinafter.

Apparatus according to the present invention includes a stator, which constitutes one part of a magnetic circuit, and a rotor mounted for rotation concentrically relative to the stator to complete the magnetic circuit. The stator is provided with a plurality of uniformly distributed windings and each of the windings is connected in a circuit including a semiconductor current switching device for controlling the flow of current therethrough. The current switching devices, which may for example be SCR's (silicon controlled rectifiers), are energized sequentially by a triggering means which operates independently of the rotor speed or position. The energization of each semiconductor current switching device effects deenergization of a previously energized switching device so that a rotating field is produced within the stator. The rotating magnetic field will cause a torque to be applied to the rotor, due either to an induced field in the rotor or to the rotor's own field if a permanent magnet rotor is employed.

In a preferred embodiment of the invention, the stator winding circuits are divided into groups with successively energized windings in the same group being separated from one another by one winding of each of the other groups. A plurality of capacitors couple or interconnect the anodes of the SCR's controlling the windings in each group so that the energization of one SCR will turn off all other then-conducting SCR's in the group.

In another aspect of the invention, the apparatus includes an inductor having a plurality of magnetically coupled windings, one for each group of stator windings. The stator windings in each group are commonly connected to a power source through a respective one of the inductor windings and the coupling between the inductor windings tends to reactively oppose transient imbalances in the currents flowing in the different groups of stator windings.

The invention accordingly comprises the constructions, circuits and methods hereinafter described, the scope of the invention being indicated in the following claims.

Figure 2:
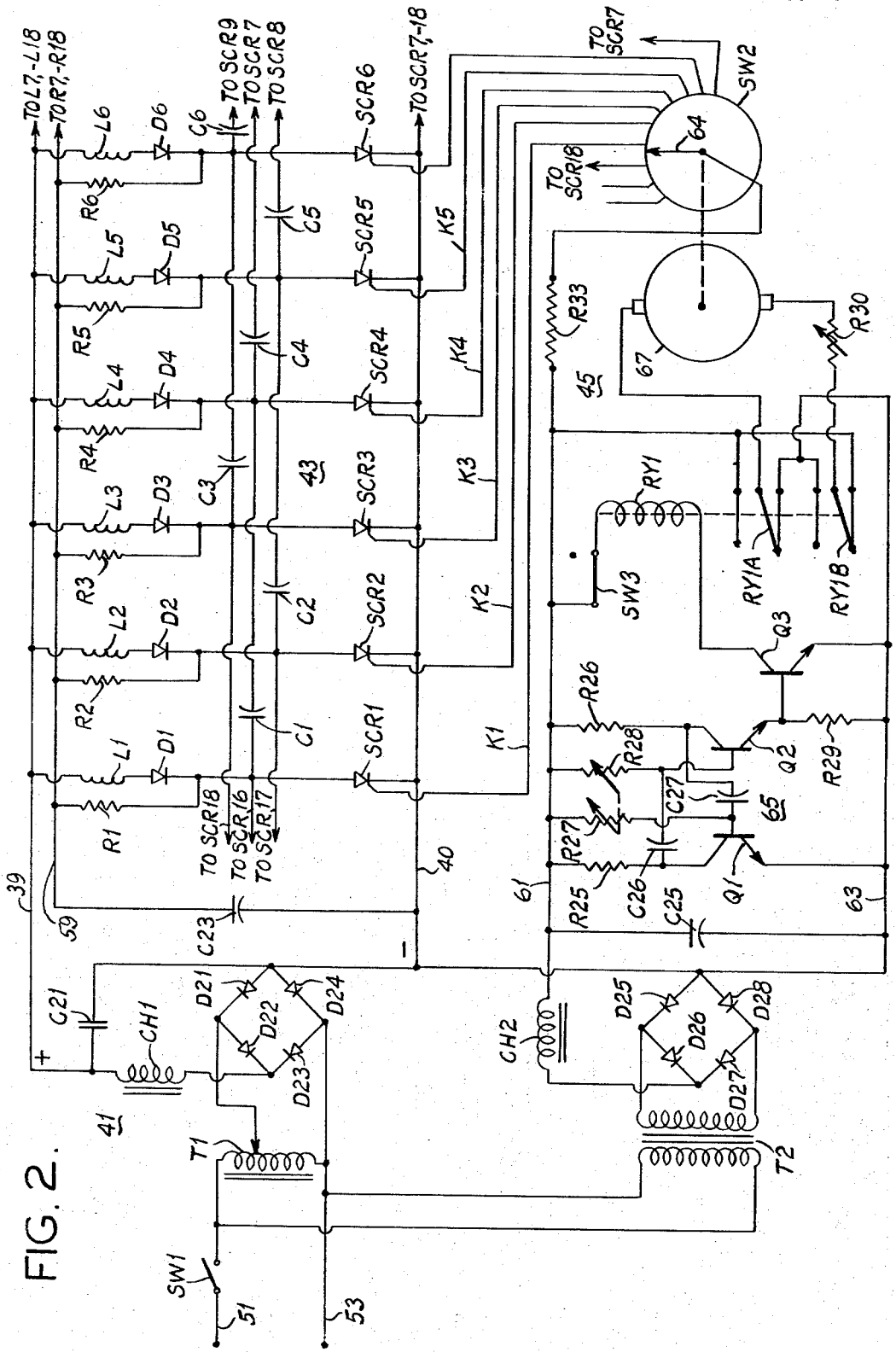
Figure 3:
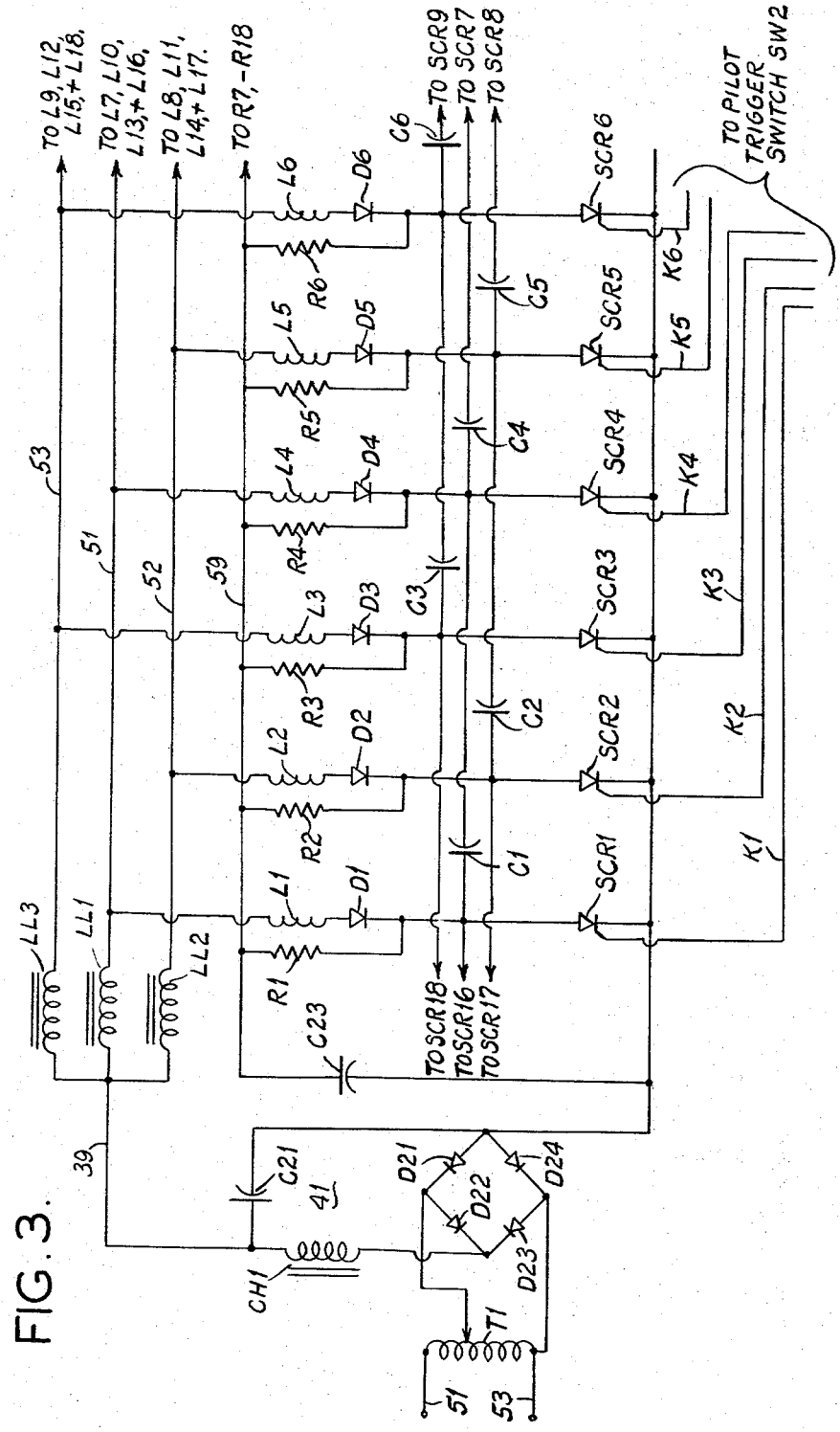
Figure 4:
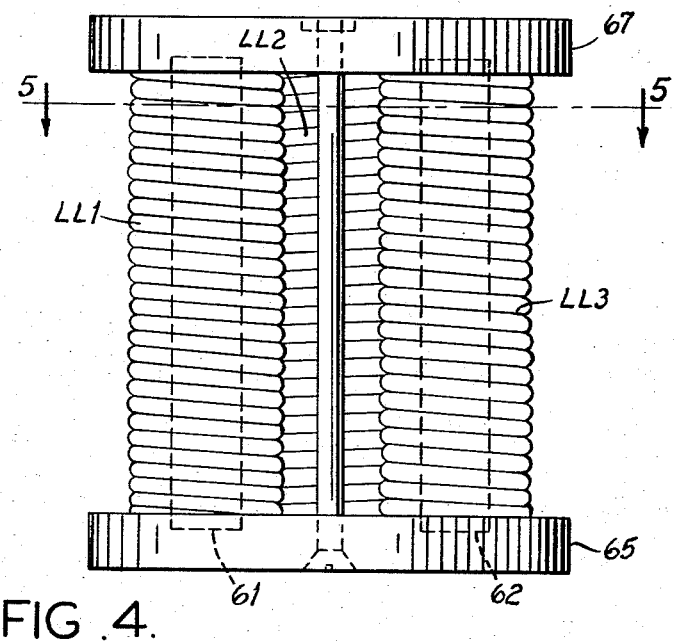
Figure 5:
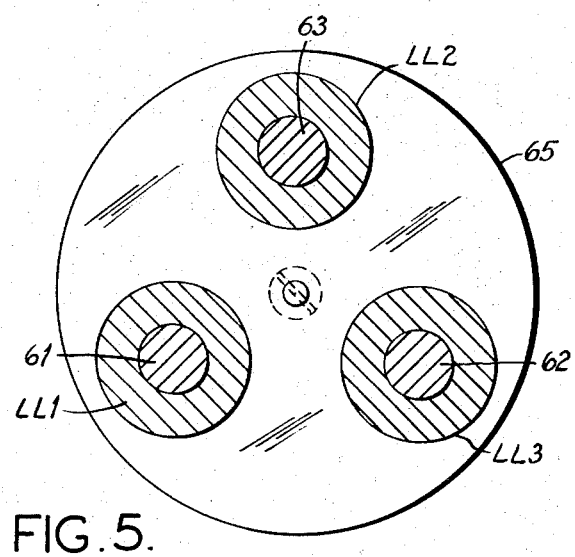
Figure 6:
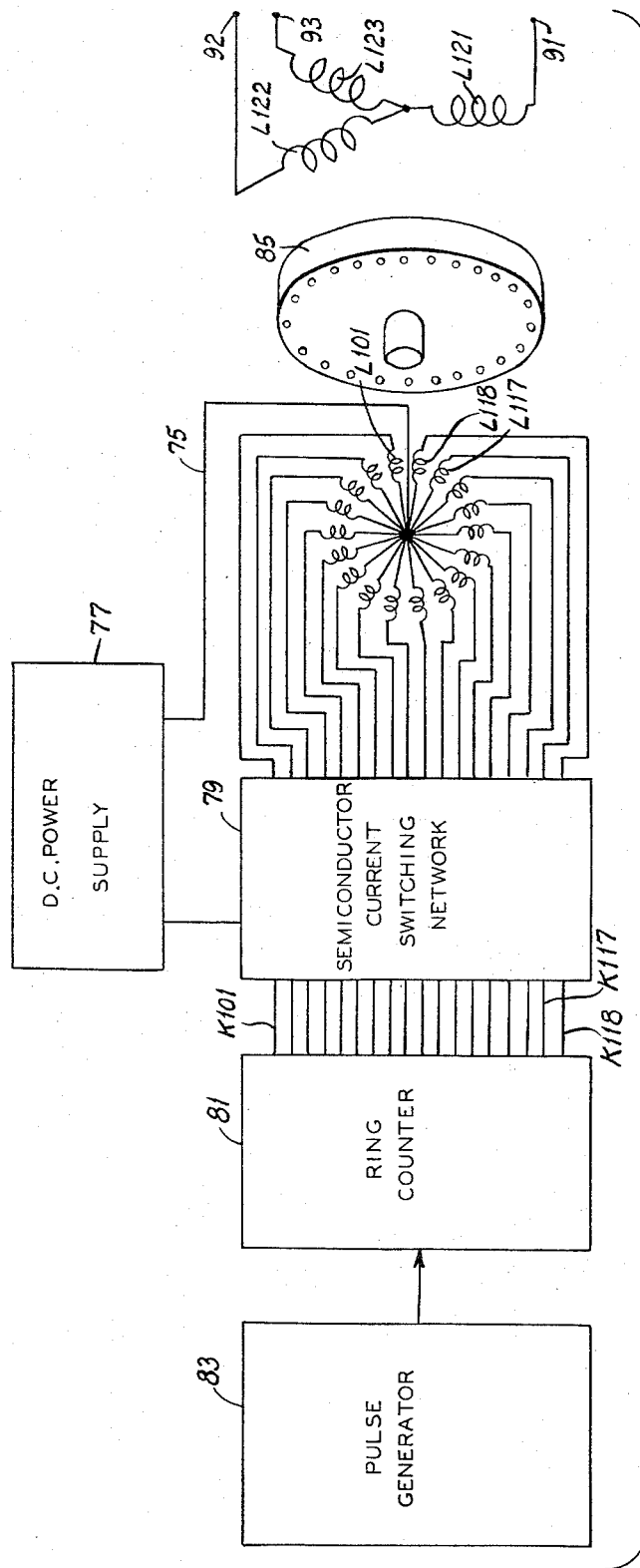

In the accompanying drawings, in which several of various possible embodiments of the invention are illustrated, FIG. 1 is a block diagram illustrating major components of an electromagnetic washing machine actuator;
FIG. 2 is a schematic circuit diagram of the FIG. 1 system;
FIG. 3 is a schematic circuit diagram of a modification;
FIG. 4 is an elevation showing the construction of an inductor employed in the modification of FIG. 3;
FIG. 5 is a section on the line 5—5 of FIG. 4; and
FIG. 6 is a block diagram of an electric power convertor.

Referring now to the drawings, FIG. 1 illustrates electromagnetic apparatus according to the invention arranged as an actuator to drive a domestic clothes washer. The clothes handling portions of the machine illustrated are essentially conventional and include a basket 11 for containing clothes and a central agitator 13. The magnetic structure of the actuator is preferably constructed in a pancake form of relatively large diameter and having a large number of poles, e.g. twelve poles, so that relatively high torque can be developed. A large number of poles is also desirable in order to achieve a relatively small displacement of the magnetic field for a given number of windings on sequential energization of the windings to thereby achieve smooth operation even at low speeds. A squirrel cage rotor 15 is mounted for rotation concentrically within a stator 19 and is connected directly to the agitator 13 by a common shaft 17. A common bearing structure suffices for both the rotor 15 and the agitator 13.

The stator 19 is wound with eighteen windings L1–L18 which are uniformly distributed with relation to each of the pairs of poles. The windings are preferably arranged in a conventional overlapping fashion so that, when a contiguous plurality thereof carry substantially equal currents, the composite magnetic field will approximate a sine function distribution around the stator.

The windings L1–L18 are connected in star configuration with one end of each winding being directly connected to a D.C. power supply 41 through a common bus 39. The other end of each of the windings L1–L18 is connected to the opposite line 40 from the D.C. supply 41 through a semiconductor current switching network 43.

A programmable pilot trigger switch 45 controls the operation of the current switching network 43 through control lines K1–K18 to energize the respective windings L1–L18 in the desired sequence. The pilot trigger switch is preferably operable at variable speed and is reversible so that the sequence and timing of winding energizations can be preselected independently of the speed and orientation of the rotor 15.

Energization of selected ones of the windings L1–L18 creates an oriented magnetic field which links the stator and the rotor. By energizing the windings sequentially, a rotating magnetic field is provided which applies a torque to the rotor 15 tending to rotate the attached agitator 13. As the orientation of the magnetic field produced by the windings L1–L18 can be controlled at will by the operation of the pilot switch 45, the rotor 15 can be made to behave in similar fashion, although with some characteristic slip. By replacing the squirrel cage rotor 15 with a conventional permanent magnet rotor, the position of the rotor is caused to track quite closely the movement of the switch 45 providing an operation similar to that of a synchro or selsyn. Other types of rotors such as hysteresis or repulsion types could also be used.

It will be noted that arrangements other than the star configuration of winding connectors shown in FIG. 1, such as, for example, a ring configuration with the windings connected in series, may be used with suitable control means.

Referring now to FIG. 2 which illustrates the individual components which constitute the FIG. 1 system and their interconnection, power for the control system is obtained from A.C. lines 51 and 53 through a variable-tap autotransformer T1. An on-off switch SW1 is interposed in the line 51. The adjustable A.C. voltage provided by the transformer T1 is rectified in a full-wave bridge circuit employing diodes D21–D24. The pulsating D.C. thereby obtained is smoothed in a filter circuit including a capacitor C21 and a choke CH1 to provide a source of filtered D.C. between the lines 39 and 40. Line 39 is positive with respect to line 40 which constitutes the common or ground potential.

Each of the windings L1–L18 is connected across the D.C. source lines 39 and 40 through a circuit which includes a silicon controlled rectifier, SCR1–SCR18 respectively, and a series connected diode D1–D18. If the PIV ratings of the SCR's are inadequate for the voltage ranges contemplated, an additional series backup diode may optionally be placed in the anode circuit of each silicon controlled rectifier.

The anodes of the various SCR's are respectively interconnected by transfer capacitors C1–C18. These capacitors are arranged in three groups or pluralities with each capacitor coupling one of the winding circuits to the third circuit away in sequence. For example, in the first group, transfer capacitor C1 connects the first winding circuit to the fourth winding circuit, C4 connects the fourth winding circuit to the seventh winding circuit, and so on with capacitor C16 connecting the sixteenth winding circuit back to the first winding circuit. A second group of capacitors includes the capacitors C2, C5, C8, C11, C14 and C17 which respectively interconnect every third winding circuit beginning with L2 and terminating with L17. A third capacitor group respectively interconnects the third, sixth, ninth, twelfth, fifteenth and eighteenth winding circuits. It can thus be seen that the interconnection of the winding circuits by the transfer capacitors divides the winding circuits also into three groups. It will be noted that each winding in one group is separated in sequence from any other winding in the same group by one winding of each of the other groups.

It will also be noted that the total number of windings, as well as the grouping indicated previously, is illustrative and may be varied as desired so long as there is sequential energization of the windings and so long as the total number of windings per pair of poles is an even number and so long as any number up to one half the total number of windings is connected for simultaneous conduction.

The junction between the SCR and the diode in each of the winding circuits is also connected, through a respective charging resistor (R1–R18), to a line 59 which is, in turn, connected to the common line 40 through an energy storage capacitor C23. Capacitor C23 may be deleted from the circuit if desired.

Power for the pilot trigger switch circuitry 45 is obtained from the A.C. lines through a step-down transformer T2. The reduced voltage A.C. thereby obtained is rectified in a full-wave bridge comprising the diodes D25–D28. The pulsating D.C. is smoothed in a filter network including a choke CH2 and a capacitor C25 to provide a low voltage direct current source for lines 61 and 63. Line 63 is connected to the line 40 to establish a common potential between the low voltage power supply and the D.C. supply for the stator winding circuits.

The control or gate electrodes of the SCR's are respectively connected through lines K1–K18 to the stationary contacts of an eighteen pole rotary commutator or pilot switch SW2 having a movable contact arm 64. Arm 64 is electrically connected, through current limiting resistor R33, to the positive low voltage supply line 61 so that triggering current can be selectively supplied to individual SCR's in response to the positioning of arm 64.

The SCR gate electrodes require very little current for operation and therefore the commutating pilot switch SW2 may be of relatively light, simple and reliable construction. Contact arm 64 may for example comprise merely a "whisker" spring contact rotating so as to sequentially contact a plurality of fixed contacts arranged in a manner similar to the conventional commutator of a D.C. motor. Alternatively the pilot switch may be made up of a plurality of sealed magnetic reed switches which are sequentially actuated by a rotating permanent magnet.

Arm 64 of the switch SW2 is mechanically driven by a small D.C. motor 67 provided with a permanent magnet field structure so that no field current is required. The armature circuit of motor 67 is connected across the low voltage supply lines 61 and 63 through a circuit including a rheostat R30 and two sets of double-throw relay contacts RY1A and RY1B which are conventionally connected as a reversing switch. The rheostat R30 allows the speed of the motor 67 to be adjusted and its direction of rotation can be reversed by reversing the positions of the relay contacts RY1A and RY1B.

Relay contacts RY1A and RY1B are controlled by a relay coil RY1 which is connected across lines 61 and 63 in a circuit which includes, in series, a switch SW3 and the collector-emitter circuit of a power output transistor Q3. Transistor Q3 is controlled by a free-running multivibrator 65. Multivibrator 65 employs a pair of transistors Q1 and Q2 provided with collector circuit load resistors R25 and R26. Capacitors C26 and C27 are conventional cross coupling capacitors and ganged rheostats R27 and R28 provide bias current and adjustable capacitor charging rates for selecting the characteristic period of oscillation of the multivibrator. As will be apparent hereinafter, multivibrator 65 provides timing of direction reversals for the rotor 15 and the period of the multivibrator oscillations are therefore chosen to produce effective oscillatory excursions of the agitator 13.

An output signal from multivibrator 65 is coupled directly from the emitter of transistor Q2 to the base of power transistor Q3. A resistor R29 is connected across the base-emitter junction of the transistor Q3 and thus shunts any leakage currents and assures that the transistor Q3 will be cut off when transistor Q2 is not conducting.

The operation of this actuator system is as follows, it being assumed for the moment that switch SW3 is open:

When power is supplied to the system by the closing of switch SW1, the pilot switch motor 67 begins to rotate continuously in one direction only since relay coil RY1 is deenergized by the opening of switch SW3. Direct current power is simultaneously made available to the windings L1–L18 from the D.C. supply 41 through the lines 39 and 40. As the movable arm 64 of the pilot switch SW3 rotates, pulses of current are applied to the gate electrodes of successive ones of the SCR's. These pulses will cause the SCR's to conduct and to thereby sequentially energize the respective windings L1–L18.

It is a characteristic of the silicon controlled rectifier device that, once fired, it will continue to conduct as long as it is forward biased, that is, until the anode current is reduced below its holding value. In the embodiment illustrated, turnoff is effected by a momentary reverse bias applied by means of the transfer capacitors C1–C18. When one of the SCR's is fired, a negative-going pulse is coupled, through the interconnecting transfer capacitors, to the anodes of all of the other SCR's in the same group. Any then-conducting SCR's within the group will be turned off. Thus, within each group, only one winding will be energized at a time.

As described previously, each winding in a given group is separated from the next winding in the same group by one winding from each of the other groups. Thus, since the SCR's are energized sequentially, each winding will remain energized while windings from the two other groups are energized and then, when a second winding from the same group is energized, the first winding will be deenergized. Accordingly, in the apparatus illustrated, three windings, one from each group, are in an energized state concurrently.

To further explain this mode of operation, the following examples is useful, it being assumed that the switch contact arm 64 is rotating clockwise as seen in FIG. 2 and is starting from a straight up position. SCR1 will be energized first and will continue to conduct whle SCR2 is fired. Both SCR1 and SCR2 will continue to conduct when conduction in SCR3 is initiated. However, when SCR4 is fired, SCR1 will be turned off by the negative pulse applied at its anode through the transfer capacitors, primarily C1 and secondarly the remainng transfer capacitors of the group. Similarly, when SCR5 is turned on, SCR2 will be turned off. Thus, a sequentially shifting plurality of windings will be energized concurrently.

It should be noted that the number of SCR's which are conducting at any given moment is equal to the number of groups of windings and transfer capacitors. This is a necessary relationship in that, as explained above, the energization of any given SCR will turn off any other then-conducting SCR which is interconnected in the same capacitor group. A related requirement is that the total number of winding circuits shall be integrally divisible by the number of groups. Otherwise the capacitor groups would not be independent and the energization of one winding circuit could turn off all other then-conducting circuits. It will be understood that this integral relationship will not be required if other SCR turn off means or other power control means are employed.

As windings to one side of the oriented field are sequentially energized and windings to the other side of the field are sequentially deenergized, the field will effectively rotate and its rotation will cause a torque to be developed between the squirrel cage rotor 15 and the stator 19. As the transfer capacitors C1–C18 are connected in groups which are ring-like in configuration, it will be readily understood that the actuator can be operated in either direction with the same turn-off operation.

To assure that each transfer capacitor is sufficiently charged to accomplish its function, each of the SCR anode circuits is connected, through a respective charging resistor R1–R18, to a line 59 which is maintained at an appropriate positive voltage with respect to line 40. When any SCR is not conducting, its anode is raised to a positive potential by current through the respective charging resistor and the transistor capacitors connected to such an anode are charged with respect to the anode of any SCR which is then conducting. Accordingly, when a previously nonconducting SCR is energized, a strong negative-going pulse will be transmitted through the charged transfer capacitor to the anode of the previously conducting SCR in the same group, thereby turning it off. As noted previously, the diodes D1–D18 prevent any transients which may be induced in the winding L1–L18 from discharging the transfer capacitors or causing an improper triggering of the SCR's.

In the embodiment illustrated, the potential at which the line 59 is maintained is the average of the potentials at the anodes of the various SCR's, these potentials being mixed in a network comprising the various charging resistors R1–R18. The instantaneous average voltage obtained by the charging resistor network is filtered or smoothed by the energy storage capacitor C23. Over any appreciable period of time, this integrated potential will be appropriate for the transfer capacitor charging function discussed above. Thus, the transfer circuitry taken as an entirety is self-charging. It should be understood, however, that a separate and independent current supply could also be employed to maintain an appropriate potential at the line 59 and to charge the transfer capacitors.

Operation in one direction only, as described above, is useful for obtaining a spin drying operation of the clothes washing apparatus. For such an operation the basket 11 may be coupled to the agitator 13 for rotation therewith, for example, by a conventional clutch arrangement (not shown).

To obtain an oscillatory motion of the agitator 13, suitable for a washing cycle, switch SW3 is closed so that relay coil RY1 is controlled by multivibrator 65. Multivibrator 65 operates the relay RY1 so that the flow of current to the motor 67 is respectively reversed at approximately equal intervals. Motor 67 is thereby caused to rotate first in one direction and then in the other and the movable contact arm 64 of the 18 pole pilot switch SW2 will oscillate accordingly. The oscillatory operation of switch SW2 will cause a periodic reversal in the sequencing of the SCR circuits. The resulting pattern of energization of the stator windings will create an oscillatory magnetic field which will in turn impart an oscillatory movement to the rotor 15 and the agitator 13.

It should be noted that the various characteristics of the oscillatory action can be controlled substantially independently of each other so that the agitator action can be precisely tailored for an optimum clothes washing action. In particular the angular velocity of the agitator can be selected by adjustment of the pilot motor speed control rheostat R30. Similiarly, the excursions of the agitator in each direction can be adjusted by varying the setting of the ganged rheostats R27 and R28.

While equal travel in the opposite directions is typically preferable, by differentially adjusting resistances R27 and R28, the agitator will be caused to travel for a longer period of time in one direction than in the other so that a gradual precession or net rotation of the agitator is obtained. The characteristics of the reversal of direction at the end of each stroke can also be modified by modifying the characteristics of the motor 67 and the circuit powering it. For example, by artificially lowering the source impedance supplying motor 67 a faster reversal is obtained. By adding mass to the motor 67 and contact arm 64, the abruptness of the reversing action is reduced so that a sinusoidal motion is approached and a smoother operation of the agitator 13 is obtained.

The programming of a washing machine's agitation by electronic means also permits the operation of the agitator as a resonant system so that the total energy required for clothes washing is reduced. For such operation, a torsion spring of any of a variety of forms coupled to the agitator will store energy at each extreme of the agitator movement. The spring and the mass of the agitator-rotor assembly form a mechanically resonant system. The characteristic frequency of the free-running multivibrator 65 is then adjusted, by means of the resistors R27 and R28, to equal the resonant frequency of the mechanical system.

In summary, it can be seen that the rotor 15 substantially tracks the arm 64 of distributor switch SW2. Since the switch SW2 can be of relatively light construction for the reasons noted previously, its position as a function of time can be easily controlled with the result that the speed and positioning of the rotor 15 can be similarly programmed although a much higher power level is involved. Thus the present invention affords motion programming flexibility at substantial power levels.

In addition to its flexibility, the rotating field devices of this invention possess a substantial advantage over conventional A.C. motors in that they can operate at speeds above 3600 r.p.m. on standard alternating current of 60 cycles per second. Such a characteristic is highly desirable for air conditioning applications and the like where it is desired to operate a compressor at high rotational speeds.

In the embodiment illustrated in FIG. 3, the windings in each of the various interconnected groups are connected to different supply lines 51, 52 and 53 rather than to the common positive supply line 39. Each of the supply lines 51–53 is connected to the positive side of the D.C. supply 41 through an inductive winding LL1, LL2 and LL3 respectively. These windings LL1–LL3 are inductively coupled to one another by a magnetic structure which has portions common to the three magnetic circuits.

The physical arrangement of windings LL1–LL3 and the magnetic circuit structure is shown in FIGS. 4 and 5. Windings LL1–LL3 are wound on separate cylindrical cores 61–63 respectively, constructed of a suitable magnetic material. The wound cores are clamped in parallel, equally-spaced relationship between a pair of disk-shaped end plates 65 and 67 which are also constructed of a suitable magnetic material. The end plates 65 and 67 complete the magnetic circuit of each of the windings LL1–LL3 so that the magnetic circuit of each winding includes the cores of the other two in parallel. If desired, end plate 65 or 67 or both may be spaced from the ends of cores 61 to 63 to provide an air gap or gaps.

It will be understood that the inductor of FIGS. 4 and 5 would in the general case have a number of legs or windings equal to the number of windings simultaneously conducting in the stator (which is the same as the number of groups of turn-off capacitors). Thus in a steady-state condition with each inductor winding carrying equal current in the same direction, there would be practically zero flux in the iron core. There would be no metallic return path for the flux (the central tie-stud being nonmagnetic). In general, an air-gap is introduced in each leg of the core. It will also be understood that the inductor is not essential to operation, but is for the purpose of improving the efficiency. Further, the configuration of the inductor may have a variety of forms. For example, the magnetic core can be part of the stator laminated core structure, and the inductor windings could lie in slots around the external periphery thereof.

The rotating field apparatus according to the invention operates most efficiently when each of the energized stator windings L1–L18 carry substantially equal currents. When this condition is met, the magnetic field in the stator most nearly approximates a sine function distribution. The inductively coupled windings LL1–LL3 aid in providing this condition of operation by reactively opposing any transient imbalances in the currents carried by the active windings in the various groups, there being only one energized winding in each group at one time. If the windings LL1–LL3 are not used, the current traversing each of the stator windings L1–L18 will be dependent upon the back e.m.f. induced in that winding by the magnetic field rotating with the stator so that current imbalances can exist.

The use of the coupled windings LL1–LL3 is also beneficial in assuring that each SCR is turned off at the proper point in the cycle. When each SCR is initially fired, a negative-going transient will be produced across the respective inductor winding and this transient will aid the pulse coupled through the transfer capacitors (C1–C18) in turning off all other SCR's in the same group.

In place of a mechanically commutating pilot switch, such as the switch SW2 shown in FIG. 2, entirely electronic means can be employed for triggering the SCR's. For example, firing pulses could be taken from a ring counter which in turn is triggered by a variable rate pulse source. A variety of ring counters are known and can be easily adapted to provide suitable SCR firing pulses. Also, for example, a binary counter provided with a suitable decoding matrix and a means for resetting the counter to zero after a count of eighteen can provide eighteen independent pulse signals for firing the respective SCR's.

In the embodiment illustrated in FIG. 6, rotating field apparatus of the invention is operated under the control of a ring counter to generate polyphase alternating current power at a predetermined frequency. As in the previous examples, the stator is wound with 18 overlapping windings L101–L118 which are connected in star configuration. The common terminal of the star is connected, by line 75, to one side of a direct current power supply 77. The other end of each winding is connected to the other side of the D.C. supply through a semiconductor current switching network 79. In this example, however, the network is controlled through a plurality of control lines K101–K118, by a ring counter 81 which is triggered by a pulse generator 83. The pulse generator and ring counter combination provide a means for sequentially energize the windows L101–L118 at a predetermined frequency.

The sequential energization of the stator windings produces a rotating magnetic field which links a squirrel cage rotor 85 and causes it to rotate. If no load is placed on the rotor 85, it will tend to rotate at nearly synchronous speed and the effect of the induced field in the rotor will be to smooth out any discontinuities in the composite rotating field which might otherwise be caused by the abrupt energization of discrete windings.

The stator is provided with three output windings L121–L123 connected in a Y configuration to terminals 91–93. Windings L121–L123 are positioned 120 electrical degrees apart with respect to the stator poles. Thus, when the network 79 sequentially energizes the windings L101–L118 under the control of the pulse generator 83 and the ring counter 81, the output windings L121–L123 will be swept in sequential phase relationship by a magnetic field which very closely approximates a sine wave-form and a three-phase A.C. voltage will be generated at terminals 91–93. It should be noted that, not only is a highly desirable sine wave output obtained at the terminals 91–93, but the conversion of energy is quite efficient because of the inherent high efficiency of the abrupt switching mode of operation characteristic of SCR's. Thus it can be seen that this embodiment of the invention provides an effective means of converting D.C. power to three phase A.C. power at the frequency determined by the pulse generator 83. The device can also be employed for converting alternating current at one frequency to alternating current at another predetermined frequency by first rectifying the original A.C. to D.C. as in the embodiment of FIG. 2.

In view of the above, it will be seen that the several objects of the invention are achieved and other advantageous results attained.

As various changes could be made in the above constructions, circuits and methods without departing from the scope of the invention, it is intended that all matter contained in the above description or shown in the accompanying drawings shall be interpreted as illustrative and not in a limiting sense.

What is claimed is:

1. Electromagnetic apparatus comprising: a stator including a multiplicity of windings, said windings being distributed around said stator, one from the others; a multiplicity of semiconductor current switching devices respectively interconnected with said windings for controlling current flow therethrough; a rotor mounted for rotation concentrically relative to the stator; pilot triggering means for sequentially energizing said switching devices independently of the speed of rotation of said rotor; and means responsive to the energization of each switching device for deenergizing a previously energized switching device separated from the switching device being energized by more than one device in the sequence of energization whereby a plurality of stator windings are energized simultaneously and a rotating magnetic field is produced by said stator for applying torque to said rotor.

2. Apparatus according to claim 1 wherein the deenergization of the previously energized switching device occurs simultaneously with the energization of each switching device.

3. Apparatus according to claim 1 in which said semiconductor current switching devices comprise silicon controlled rectifiers.

4. Apparatus according to claim 3 in which the means for deenergizing previously energized rectifiers comprises transfer capacitors coupling the anode of one silicon controlled rectifier to the anode of another.

5. Apparatus according to claim 4 further comprising a current supply for charging said capacitors prior to the energization of a respective silicon controlled rectifier.

6. Apparatus according to claim 4 further comprising a diode connected in series with each stator winding for preventing transients induced in the windings from discharging said capacitors.

7. Apparatus according to claim 6 further comprising a storage capacitor and a plurality of resistors commonly connecting said anodes to said storage capacitor whereby said storage capacitor is charged from the anode circuits and each of said transfer capacitors is charged from said storage capacitor prior to energization of a respectively connected silicon controlled rectifier.

8. Apparatus according to claim 1 in which said pilot triggering means comprises an electronic circuit including at least one semiconductor element.

9. Apparatus according to claim 1 in which said rotor is a squirrel-cage rotor.

10. Apparatus according to claim 1 in which said rotor includes a permanent magnet whereby said rotor tends to rotate synchronously with the rotating magnetic field produced by the sequential energization of the stator windings.

11. Apparatus according to claim 1 further including an output winding which is swept by the rotating magnetic field produced by the sequentially energized stator windings and induced in said rotor, whereby an alternating current potential is developed across said output winding.

12. Electromagnetic apparatus comprising: a stator including a multiplicity of windings, said windings being displaced around said stator, one from the other, and being divided into a plurality of equal groups with successive windings in the same group being separated from one another by one winding of each of the other groups; a multiplicity of silicon controlled rectifiers respectively interconnected with said windings for controlling current flow therethrough; a rotor mounted for rotation concentrically relative to the stator; pilot triggering means for sequentially firing said silicon controlled rectifiers to energize said windings independently of the speed of rotation of said rotor; and a plurality of transfer capacitors interconnecting the windings in each of said groups, each of the capacitors coupling the anodes of silicon controlled rectifiers controlling successively energized windings within the respective group whereby, as each silicon controlled rectifier controlling a winding within the group is fired, other then-active silicon controlled rectifiers energizing windings within the same group are turned off and a sequentially changing plurality of windings are in an energized state concurrently, one from each group, thereby producing a rotating magnetic field which applies torque to said rotor.

13. Apparatus according to claim 12 further comprising a diode connected in series with each winding to prevent transients induced in the windings from discharging said transfer capacitors.

14. Apparatus according to claim 12 further comprising a storage capacitor and a charging resistor interconnecting the anode of each silicon controlled rectifier with said storage capacitor whereby the transfer capacitors coupling the anodes of the respective silicon controlled rectifiers are charged prior to the energization of each silicon controlled rectifier.

15. Electromagnetic apparatus comprising: a stator including a multiplicity of windings, each stator winding having a first terminal and a second terminal, said windings being displaced around said stator, one from the others, and being divided into a plurality of equal groups with successive windings in the same group being separated from one another by one winding of each of the other groups; a silicon controlled rectifier connected in series with each of said stator windings for controlling current flow therethrough, the anode of each silicon controlled rectifier being connected to the second terminal of the respective winding; a rotor mounted for rotation concentrically relative to the stator; pilot triggering means for firing said silicon controlled rectifiers to sequentially energize said stator windings independently of the speed of rotation of said rotor; a plurality of capacitors interconnecting the windings in each of said groups, each capacitor coupling the anodes of silicon controlled rectifiers controlling successively energized windings within the group; and an inductor having a plurality of windings, one for each group of stator windings, the first terminals of stator windings in each group being commonly connected to a source of electric power through a respective one of the inductor windings, said inductor windings being magnetically coupled to one another; whereby transient imbalances in the currents flowing in the different groups of stator windings are reactively opposed.

16. Electromagnetic apparatus comprising: a rotor a stator including a multiplicity of stator windings, said windings being displaced around said stator, one from the others, and being divided into groups with successive windings in one group being separated from each other by one winding of each of the other groups; an inductor having a plurality of magnetically coupled windings, the stator windings within each of said groups being commonly connected to a source of electric power through a respective one of said inductor windings; and current switching means for sequentially and abruptly energizing and deenergizing said stator windings independently of the speed of said rotor, one winding in each group being energized at any moment, whereby a rotating magnetic field is produced in said stator by substantially balanced currents flowing through selected windings from each of said groups.

References Cited

UNITED STATES PATENTS

| | | | |
|---|---|---|---|
| 3,005,941 | 10/1961 | Heggen | 310—49 X |
| 3,112,433 | 11/1963 | Fairbanks | 318—138 XR |
| 3,140,433 | 7/1964 | Stoffels | 310—49 X |
| 3,218,535 | 11/1965 | Holthaus et al. | 318—138 |
| 3,229,179 | 1/1966 | Hetzel | 318—138 |
| 3,241,017 | 3/1966 | Madsen et al. | 318—138 |
| 3,250,977 | 5/1966 | Heggen | 310—49 X |

ORIS L. RADER, *Primary Examiner.*

G. SIMMONS, *Assistant Examiner.*